(12) United States Patent
Birau et al.

(10) Patent No.: US 9,422,436 B2
(45) Date of Patent: Aug. 23, 2016

(54) METHODS FOR PRODUCING INKS

(71) Applicant: Xerox Corporation, Norwalk, CT (US)

(72) Inventors: Mihaela Maria Birau, Mississauga (CA); C. Geoffrey Allen, Waterdown (CA); Aurelian Valeriu Magdalinis, Aurora (CA); Kurt Ira Halfyard, Mississauga (CA); Biby Esther Abraham, Mississauga (CA); James D. Mayo, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 11 days.

(21) Appl. No.: 14/153,272

(22) Filed: Jan. 13, 2014

(65) Prior Publication Data

US 2015/0197647 A1 Jul. 16, 2015

(51) Int. Cl.
- *C08F 2/46* (2006.01)
- *C08G 61/04* (2006.01)
- *C09D 11/02* (2014.01)
- *C09D 11/101* (2014.01)

(52) U.S. Cl.
CPC ............ *C09D 11/02* (2013.01); *C09D 11/101* (2013.01)

(58) Field of Classification Search
USPC .................................. 522/181, 178, 1; 520/1
See application file for complete search history.

(56) References Cited

U.S. PATENT DOCUMENTS

| | | | |
|---|---|---|---|
| 2003/0021961 A1* | 1/2003 | Ylitalo et al. | 428/195 |
| 2010/0022676 A1* | 1/2010 | Rogers et al. | 522/20 |
| 2012/0274716 A1* | 11/2012 | McConville et al. | 347/102 |
| 2014/0176652 A1* | 6/2014 | Toosi et al. | 347/88 |

OTHER PUBLICATIONS

Resodyn Acoustic Mixers, Inc, 2009, www.resodynmixers.com/technologies.*
Torrey Hills Technologies, LLC, Oct. 21, 2012, http://www.threerollmill.com/documents/Ink.pdf.*

* cited by examiner

*Primary Examiner* — Ling Choi
*Assistant Examiner* — Jessica E Whiteley
(74) *Attorney, Agent, or Firm* — Fay Sharpe LLP

(57) ABSTRACT

Ink compositions are prepared by processes that include acoustically mixing a plurality of components at a resonance frequency. This encourages mixing of the components over a large range of viscosities with a minimal temperature rise and also shortens mixing time.

19 Claims, 6 Drawing Sheets

METHODS FOR PRODUCING INKS

BACKGROUND

The present disclosure relates to methods of producing ink compositions, particularly certain ink compositions which are compatible with dampening fluids and are useful for variable data lithographic printing.

Offset lithography is a common method of printing today. (For the purposes hereof, the terms "printing" and "marking" are interchangeable.) In a typical lithographic process a printing plate, which may be a flat plate, the surface of a cylinder, or belt, etc., is formed to have "image regions" formed of a hydrophobic/oleophilic material, and "non-image regions" formed of a hydrophilic/oleophobic material. The image regions correspond to the areas on the final print (i.e., the target substrate) that are occupied by a printing or marking material such as ink, whereas the non-image regions correspond to the areas on the final print that are not occupied by said marking material. The hydrophilic regions accept and are readily wetted by a water-based fluid, commonly referred to as a dampening fluid or fountain fluid (typically consisting of water and a small amount of alcohol as well as other additives and/or surfactants to reduce surface tension). The hydrophobic regions repel dampening fluid and accept ink, whereas the dampening fluid formed over the hydrophilic regions forms a fluid "release layer" for rejecting ink. The hydrophilic regions of the printing plate thus correspond to unprinted areas, or "non-image areas", of the final print.

The ink may be transferred directly to a target substrate, such as paper, or may be applied to an intermediate surface, such as an offset (or blanket) cylinder in an offset printing system. The offset cylinder is covered with a conformable coating or sleeve with a surface that can conform to the texture of the target substrate, which may have surface peak-to-valley depth somewhat greater than the surface peak-to-valley depth of the imaging plate. Also, the surface roughness of the offset blanket cylinder helps to deliver a more uniform layer of printing material to the target substrate free of defects such as mottle. Sufficient pressure is used to transfer the image from the offset cylinder to the target substrate. Pinching the target substrate between the offset cylinder and an impression cylinder provides this pressure.

Typical lithographic and offset printing techniques utilize plates which are permanently patterned, and are therefore useful only when printing a large number of copies of the same image (i.e. long print runs), such as magazines, newspapers, and the like. However, they do not permit creating and printing a new pattern from one page to the next without removing and replacing the print cylinder and/or the imaging plate (i.e., the technique cannot accommodate true high speed variable data printing wherein the image changes from impression to impression, for example, as in the case of digital printing systems). Furthermore, the cost of the permanently patterned imaging plates or cylinders is amortized over the number of copies. The cost per printed copy is therefore higher for shorter print runs of the same image than for longer print runs of the same image, as opposed to prints from digital printing systems.

Accordingly, a lithographic technique, referred to as variable data lithography, has been developed which uses a non-patterned reimageable surface that is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned reimageable surface. Ink applied thereover is retained in the pockets formed by the removal of the dampening fluid. The inked surface is then brought into contact with a substrate, and the ink transfers from the pockets in the dampening fluid layer to the substrate. The dampening fluid may then be removed, a new uniform layer of dampening fluid applied to the reimageable surface, and the process repeated.

Conventional processes for making lithographic ink compositions include high shear mixing, resulting in very time consuming and complex processes which require a multitude of steps. Another downside of these traditional processes is that processing time increases with an increase in scale.

It would be desirable to develop processes for making lithographic ink compositions that are less time consuming and less complex.

BRIEF DESCRIPTION

The present disclosure relates to methods for producing ink compositions that include acoustic mixing.

Disclosed herein in various embodiments are methods for producing an ink composition, comprising: acoustically mixing a reaction mixture to form a mixed ink batch; and milling the mixed ink batch to obtain the ink composition.

The methods can further comprise melt mixing the mixed ink prior to milling the mixed ink batch. The melt mixing can be performed for a period of about 10 minutes to about 1 hour. The melt mixing can be performed at a temperature of about 50° C. to about 100° C.

Sometimes, the methods further comprise: melt mixing a starting mixture that does not contain colorant; and adding a colorant to the starting mixture to form the reaction mixture that is subsequently acoustically mixed. Again, the melt mixing can be performed for a period of about 10 minutes to about 1 hour. The melt mixing can be performed at a temperature of about 50° C. to about 100° C. The starting mixture can comprise a dispersant, a plurality of curable compounds, a photoinitiator, a thermal stabilizer, and a filler.

The acoustic mixing can be performed for a period of about 3 minutes to about 20 minutes. The acoustic mixing can be performed at an acceleration of about 30 g's to about 130 g's. The acoustic mixing can be performed at a frequency of from about 50 Hz to about 100 Hz.

Heat can be applied during the milling.

The reaction mixture may have a volume of about 4 gallons to about 60 gallons.

In particular embodiments, the reaction mixture comprises, based on the total weight of the reaction mixture, more than 50 wt % of a plurality of curable compounds. The plurality of curable compounds can include: from about 3 to about 75 wt % of at least one oligomer; and from about 3 to about 25 wt % of at least one monomer. One or more of the curable compounds should be crosslinkable.

In particular embodiments, the reaction mixture further comprises: from about 10 to about 40 wt % of a colorant; from about 4 to about 16 wt % of a dispersant; from 0 to about 10 wt % of a photoinitiator; from about 0.1 to about 1 wt % of a thermal stabilizer; and from about 0.2 to about 5 wt % of a filler.

In specific embodiments, the oligomer in the reaction mixture is a polyester acrylate. In other specific embodiments, the monomer in the reaction mixture is a trimethylolpropane triacrylate.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
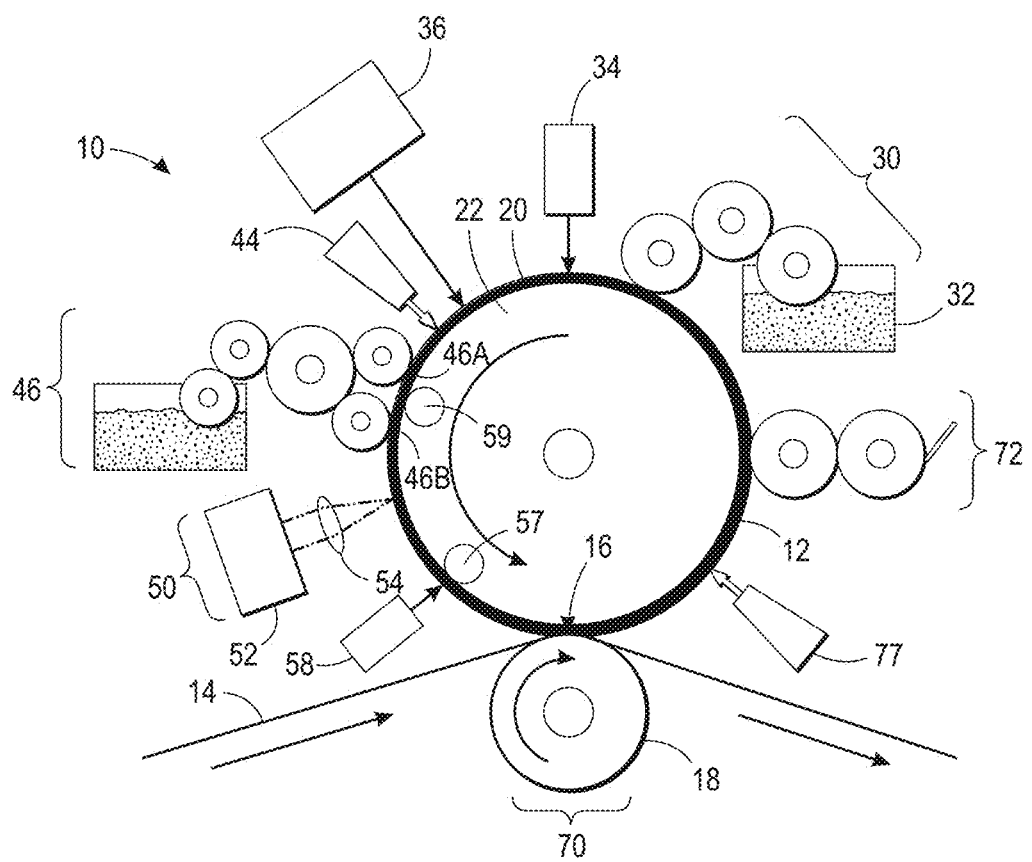
FIG. 1 illustrates a variable lithographic printing apparatus in which the ink compositions of the present disclosure may be used.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The present disclosure relates to methods of making ink compositions that are suitable for use in digital offset printing processes. The methods include acoustically mixing ink components at a resonant frequency. Acoustic mixing is suitable for many types of compositions, e.g. liquid-liquid, liquid-solid, and solid-solid systems. Acoustic mixing can also be applied to compositions over a large range of viscosities, e.g. from hundreds of centipoise (cP) up to 100 million cP. Another advantage of this method is that the rise in temperature during the mixing of highly viscous materials is usually less than 15° C., which can be very important which thermally sensitive materials are being mixed. The mixing time is also independent of scale, i.e. large batches take the same amount of time to mix as small batches. Also, no solvents are needed.

FIG. 1 illustrates a system for variable lithography in which the ink compositions of the present disclosure may be used. The system 10 comprises an imaging member 12. The imaging member comprises a substrate 22 and a reimageable surface layer 20. The surface layer is the outermost layer of the imaging member, i.e. the layer of the imaging member furthest from the substrate. As shown here, the substrate 22 is in the shape of a cylinder; however, the substrate may also be in a belt form, etc. The surface layer 20 is typically a silicone (e.g. a methylsilicone or fluorosilicone), which may have carbon black added to increase energy absorption of the surface layer.

In the depicted embodiment, the imaging member 12 rotates counterclockwise and starts with a clean surface. Disposed at a first location is a dampening fluid subsystem 30, which uniformly wets the surface with dampening fluid 32 to form a layer having a uniform and controlled thickness. Ideally the dampening fluid layer is between about 0.05 micrometers and about 1.0 micrometers in thickness, is uniform, and is without pinholes. A sensor 34, such as an in-situ non-contact laser gloss sensor or laser contrast sensor, is used to confirm the uniformity of the layer. Such a sensor can be used to automate the dampening fluid subsystem 30.

At optical patterning subsystem 36, the dampening fluid layer is exposed to an energy source (e.g. a laser) that selectively applies energy to portions of the layer to imagewise evaporate the dampening fluid and create a latent "negative" of the ink image that is desired to be printed on the receiving substrate. Image areas are created where ink is desired, and non-image areas are created where the dampening fluid remains. An optional air knife 44 is also shown here to control airflow over the surface layer 20 for the purpose of maintaining clean dry air supply, a controlled air temperature, and reducing dust contamination prior to inking. Next, the ink composition is applied to the imaging member using inker subsystem 46. Inker subsystem 46 may consist of a "keyless" system using an anilox roller to meter an offset ink composition onto one or more forming rollers 46A, 46B. The ink composition is applied to the image areas to form an ink image.

A rheology control subsystem 50 may be present to partially cure or tack the ink image. This curing source may be, for example, an ultraviolet light emitting diode (UV-LED) 52, which can be focused as desired using optics 54. Another way of increasing the cohesion and viscosity employs cooling of the ink composition. This could be done, for example, by blowing cool air over the reimageable surface from jet 58 after the ink composition has been applied but before the ink composition is transferred to the target substrate. Alternatively, a heating element 59 could be used near the inker subsystem 46 to maintain a first temperature and a cooling element 57 could be used to maintain a cooler second temperature near the nip 16.

The ink image is then transferred to the target or receiving substrate 14 at transfer subsystem 70. This is accomplished by passing a recording medium or receiving substrate 14, such as paper, through the nip 16 between the impression roller 18 and the imaging member 12. The final receiving substrate 14 can be, for example, paper, plastic, or metal.

Finally, the imaging member should be cleaned of any residual ink or dampening fluid. Most of this residue can be easily removed quickly using an air knife 77 with sufficient air flow. Removal of any remaining ink can be accomplished at cleaning subsystem 72.

It should be noted that the apparatus depicted in FIG. 1 transfers the ink directly from the imaging member to the paper, so that the ink must fully release from the imaging member and should enable high quality printing at high speeds. Traditional offset inks are designed to work best with an intermediate transfer member between the imaging member and the final target substrate (i.e. paper). Traditional inks suffer from one or more shortfalls including: solubility in the dampening fluid, swelling of the silicone layer on the imaging member, poor release properties from the imaging member, and limited curing performance. The ink compositions of the present disclosure have certain wetting and release properties that are useful with the imaging member, and the ink compositions are also compatible with non-aqueous dampening fluids.

The ink compositions that can be mixed using the methods of the present disclosure comprise a plurality of selected curable compounds and an optional colorant, as well as other additives. The curable compounds can be cured under ultraviolet (UV) light to fix the ink in place on the final receiving substrate. The ingredients/components of the ink composition are discussed further here, prior to discussing the acoustic mixing methods of the present disclosure. In this regard, it is noted that the ink composition is made from a reaction mixture and does not need solvent. Thus, references to the weight percentage of ink composition should also be construed as applying to the reaction mixture, and vice versa.

As used herein, the term "colorant" includes pigments, dyes, mixtures of dyes, mixtures of pigments, mixtures of dyes and pigments, and the like. Any dye or pigment may be chosen, provided that it is capable of being dispersed or dissolved in the ink composition and is compatible with the other ink ingredients. The colorant is present in the ink composition in any desired amount, and is typically present in an amount of from about 10 to about 40 weight percent (wt %), based on the total weight of the ink composition. In more specific embodiments, the colorant is present in an amount of from about 15 to about 35 wt %, based on the total weight of the composition. Various pigments and dyes are known in the art, and are commercially available from suppliers such as Clariant, BASF, and Ciba, to name just a few.

A plurality of curable compounds are present in the ink composition/reaction mixture. More specifically, the plurality of curable compounds typically includes at least one monomer, and at least one oligomer. Several such monomers and oligomers are commercially available from Sartomer.

Curable monomers which can be used in the ink compositions may include Sartomer SR-259; SR306F; SR-492; SR454; SR-368D; SR444; SR-348; SR-349; and CN309.

Sartomer SR-259 is a polyethylene glycol diacrylate monomer. SR-259 is a clear liquid having a specific gravity of 1.122 at 25° C., a viscosity of 25 cps at 25° C., a surface tension of 41.3 dynes/cm, and a molecular weight of 302 g-mole$^{-1}$.

Sartomer SR306F is a tripropylene glycol diacrylate monomer. SR306F is a clear liquid having a specific gravity of 1.038 at 25° C., a viscosity of 15 cps at 25° C., a surface tension of 33.3 dynes/cm, and a molecular weight of 300 g-mole$^{-1}$.

Sartomer SR-492 is a propoxylated trimethylolpropane triacrylate monomer. SR-492 is a clear liquid having a specific gravity of 1.050 at 25° C., a viscosity of 90 cps at 25° C., a surface tension of 34.0 dynes/cm, and a molecular weight of 470 g/mol.

Sartomer SR454 is an ethoxylated trimethylolpropane triacrylate monomer. SR454 is a clear liquid having a specific gravity of 1.103 at 25° C., a viscosity of 60 cps at 25° C., a surface tension of 39.6 dynes/cm, and a molecular weight of 428 g/mol.

Sartomer SR-368D is a tris(2-hydroxyethyl) isocyanurate triacrylate monomer. SR-368D is a clear liquid having a specific gravity of 1.158 at 25° C. and a viscosity of 330 cps at 25° C.

Sartomer SR444 is a pentaerythritol triacrylate monomer. SR444 is a clear liquid having a specific gravity of 1.162 at 25° C., a viscosity of 520 cps at 25° C., a surface tension of 39.0 dynes/cm, and a molecular weight of 298 g/mol.

Sartomer SR-348 is an ethoxylated bisphenol A dimethacrylate monomer. SR-348 is a clear liquid having a specific gravity of 1.119 at 25° C., a viscosity of 1082 cps at 25° C., a surface tension of 41.0 dynes/cm, and a molecular weight of 452 g/mol.

Sartomer SR-349 is an ethoxylated bisphenol A diacrylate monomer. SR-349 is a clear liquid having a specific gravity of 1.1.45 at 25° C., a viscosity of 1600 cps at 25° C., a surface tension of 43.6 dynes/cm, and a molecular weight of 468 g/mol.

Other suitable monomers, such as mono-, di-, tri-, or higher-functional monomers, some of which may the same or similar to those described above, may include one or more of the following:

| Mono-functional | |
| --- | --- |
| Sartomer Code | Chemical Name |
| CD278 | acrylate ester |
| CD420 | acrylic monomer |
| CD421 | 3,3,5 trimethylcyclohexyl methacrylate |
| CD535 | dicyclopentadienyl methacrylate |
| CD545 | diethylene glycol methyl ether methacrylate |
| CD551 | methoxy polyethylene glycol (350) monoacrylate |
| CD552 | methoxy polyethylene glycol (550) monomethacrylate |
| CD553 | methoxy polyethylene glycol (550) monoacrylate |
| CD585 | acrylate ester |
| CD587 | acrylate ester |
| CD588 | acrylate ester |
| CD611 | alkoxylated tetrahydrofurfuryl acrylate |
| CD612 | ethoxylated (4) nonyl phenol methacrylate |
| CD613 | ethoxylated nonyl phenol acrylate |
| CD730 | triethylene glycol ethyl ether methacrylate |
| CD9050 | monofunctional acid ester |
| CD9075 | alkoxylated lauryl acrylate |
| CD9087 | alkoxylated phenol acrylate |
| CD9088 | alkoxylated phenol acrylate |
| SR203 | tetrahydrofurfuryl methacrylate |
| SR242 | isodecyl methacrylate |
| SR256 | 2(2-ethoxyethoxy) ethyl acrylate |
| SR257 | stearyl acrylate |
| SR285 | tetrahydrofurfuryl acrylate |
| SR313 | lauryl methacrylate |
| SR324 | stearyl methacrylate |
| SR335 | lauryl acrylate |
| SR339 | 2-phenoxyethyl acrylate |
| SR340 | 2-phenoxylethyl methacrylate |
| SR395 | isodecyl acrylate |
| SR423 | isobornyl methacrylate |
| SR440 | isooctyl acrylate |
| SR484 | octadecyl acrylate |
| SR489 | tridecyl acrylate |
| SR493 | tridecyl methacrylate |
| SR495 | caprolactone acrylate |
| SR504 | ethoxylated (4) nonyl phenol acrylate |
| SR506 | isobornyl acrylate |

-continued

Mono-functional

| Sartomer Code | Chemical Name |
|---|---|
| SR531 | cyclic trimethylolpropane formal acrylate |
| SR550 | methoxy polyethylene glycol (350) monomethacrylate |
| SR709 | metallic monomethacrylate |

Di-functional

| Sartomer Code | Chemical Name |
|---|---|
| CD262 | 1,12 Dodecandediol Dimethacrylate |
| CD401 | cyclohexane dimethanol dimethacrylate |
| CD406 | cyclohexane dimethanol diacrylate |
| CD536 | acrylate ester |
| CD542 | ethoxylated (8) bisphenol A dimethacrylate |
| CD560 | alkoxylated hexanediol diacrylate |
| CD561 | alkoxylated hexanediol diacrylate |
| CD562 | alkoxylated hexanediol diacrylate |
| CD563 | alkoxylated hexanediol diacrylate |
| CD564 | alkoxylated hexanediol diacrylate |
| CD580 | alkoxylated cyclohexane dimethanol diacrylate |
| CD581 | alkoxylated cyclohexane dimethanol diacrylate |
| CD582 | alkoxylated cyclohexane dimethanol diacrylate |
| CD595 | acrylate ester |
| CD9038 | ethoxylated (30) bisphenol A diacrylate |
| CD9043 | alkoxylated neopentyl glycol diacrylate |
| CD9044 | alkoxylated neopentyl glycol diacrylate |
| SR101 | ethoxylated bisphenol A dimethacrylate |
| SR150 | ethoxylated bisphenol A dimethacrylate |
| SR205 | triethylene glycol dimethacrylate |
| SR206 | ethylene glycol dimethacrylate |
| SR209 | tetraethylene glycol dimethacrylate |
| SR210 | polyethylene glycol dimethacrylate |
| SR212B | 1,3-Butylene Glycol Diacrylate |
| SR213 | 1,4-butanediol diacrylate |
| SR214 | 1,4-butanediol dimethylacrylate |
| SR230 | diethylene glycol diacrylate |
| SR231 | diethylene glycol dimethacrylate |
| SR238 | 1,6-hexanediol diacrylate |
| SR239 | 1,6-hexanediol dimethacrylate |
| SR247 | neopentyl glycol diacrylate |
| SR248 | neopentyl glycol dimethacrylate |
| SR252 | polyethylene glycol (600) dimethacrylate |
| SR259 | polyethylene glycol (200) diacrylate |
| SR268 | tetraethylene glycol diacrylate |
| SR272 | triethylene glycol diacrylate |
| SR297 | 1,3-butylene glycol dimethacrylate |
| SR306 | tripropylene glycol diacrylate |
| SR341 | diacrylate ester |
| SR344 | polyethylene glycol (400) diacrylate |
| SR348 | ethoxylated (2) bisphenol A dimethacrylate |
| SR349 | ethoxylated (3) bisphenol A diacrylate |
| SR480 | ethoxylated (10) bisphenol dimethacrylate |
| SR508 | dipropylene glycol diacrylate |
| SR540 | ethoxylated (4) bisphenol A dimethacrylate |
| SR541 | ethoxylated (6) bisphenol A dimethacrylate |
| SR601 | ethoxylated (4) bisphenol A diacrylate |
| SR602 | ethoxylated (10) bisphenol A diacrylate |
| SR603 | polyethylene glycol (400) dimethacrylate |
| SR610 | polyethylene glycol (600) diacrylate |
| SR644 | polypropylene glycol (400) dimethacrylate |
| SR731 | monomer |
| SR732 | monomer |
| SR740 | polyethylene glycol (1000) dimethacrylate |
| SR833S | tricyclodecane dimethanol diacrylate |
| SR9003 | propoxylated (2) neopentyl glycol diacrylate |
| SR9036 | ethoxylated (30) bisphenol A dimethacrylate |
| SR9045 | alkoxylated neopentyl glycol diacrylate |
| SR9209A | alkoxylated aliphatic diacrylate |

Tri-functional

| Sartomer Code | Chemical Name |
|---|---|
| SR501 | propoxylated (6) trimethylolpropane triacrylate |
| CD9021 | highly propoxylated (5.5) glycol triacrylate |
| CD9051 | trifunctional acid ester |
| SR350 | trimethylolpropane trimethacrylate |
| SR351 | trimethylolpropane triacrylate |
| SR368 | tris (2-hydroxy ethyl) isocyanurate triacrylate |
| SR415 | ethoxylated (20) trimethylolpropane triacrylate |
| SR444 | pentaerythritol triacrylate |
| SR454 | ethoxylated (3) trimethylolpropane triacrylate |
| SR492 | propoxylated (3) trimethylolpropane triacrylate |
| SR499 | ethoxylated (6) trimethylolpropane triacrylate |
| SR502 | ethoxylated (9) trimethylolpropane triacrylate |
| SR9020 | propoxylated (3) glycerol triacrylate |
| SR9035 | ethoxylated (15) trimethylolpropane triacrylate |
| SR9012 | trifunctional actrylate ester |

Higher-functional

| Sartomer Code | Chemical Name |
|---|---|
| SR295 | PENTAERYTHRITOL TETRAACRYLATE |
| SR355 | ditrimethylolpropane tetraacrylate |
| SR399LV | low viscosity dipentaerythritol pentaacrylate |

Curable oligomers which can be used in the ink compositions may include Sartomer CN294E; CN2256; and CN309.

Sartomer CN294E is a tetrafunctional acrylated polyester oligomer. CN294E is a clear liquid having a specific gravity of 0.93 and a viscosity of 4,000 cps at 60° C.

Sartomer CN2256 is a polyester acrylate oligomer. CN2256 is difunctional and has a refractive index of 1.5062, a Tg of −22° C., a tensile strength of 675 psi, and a viscosity of 11,000 cps at 60° C.

Sartomer CN309 is an oligomer containing an acrylate ester that derives from an aliphatic hydrophobic backbone, or in other words is an aliphatic acrylate ester. CN309 is a clear liquid having a specific gravity of 0.92, a density of 7.68 pounds/gallon, a surface tension of 26.3 dynes/cm, a viscosity of 150 centipoise (cps) at 25° C., and a viscosity of 40 cps at 60° C.

In particular embodiments, each compound in the plurality of curable compounds is an acrylate, or in other words contains at least one acrylate group (—O—CO—C(CH$_3$)=CH$_2$). The carbon-carbon double bond in the acrylate group is available for crosslinking during the curing of the ink composition.

In particular embodiments, the plurality of curable compounds includes an oligomer selected from a tetrafunctional acrylated polyester (e.g. CN294E) or a difunctional polyester acrylate (e.g. CN2256). The plurality of curable compounds may also include a monomer which is a trimethylolpropane triacrylate (e.g. SR 9035 or SR501). The tetrafunctional acrylated polyester oligomer may be present in an amount of from about 30 to about 70 wt % of the ink composition. The difunctional polyester acrylate oligomer may be present in an amount of from about 5 to about 10 wt % of the ink composition. The trimethylolpropane triacrylate monomer may be present in an amount of from about 5 to about 15 wt % of the ink composition.

The plurality of curable compounds is generally more than 45 wt % of the ink composition (i.e. when each curable compound is included). In particular embodiments, the plurality of curable compounds makes up from about 45 to about 75 wt % of the ink composition. The oligomer(s) can make up from about 3 to about 75 wt % of the ink composition. The monomer(s) can make up from about 3 to about 25 wt % of the ink composition.

Other additives may also be present in the ink composition, such as one or more dispersants, photoinitiators, thermal stabilizers, and/or fillers.

Exemplary dispersants are SOLSPERSE 39000 or SOLSPERSE J200, available from Lubrizol; and XD-A 504 or K-SPERSE A504 from King Industries. K-SPERSE A504 has a viscosity of 22 poise at 75° C. and a specific gravity of 1.0 at 25° C. The dispersant(s) may be present in an amount of from about 4 to about 16 wt % of the ink composition, or from about 4 wt % to about 6 wt %.

Exemplary photoinitiators include IRGACURE 379, IRGACURE 184 and IRGACURE 819, both available from Ciba Specialty Chemicals. IRGACURE 379 is 2-dimethylamino-2-(4-methyl-benzyl)-1-(4-morpholino-4-yl-phenyl) =butan-1-one, with a molecular weight of 380.5. IRGACURE 184 is 1-hydroxy-cyclohexyl-phenyl-ketone, having a molecular weight of 204.3. IRGACURE 819 is bis(2,4,6-trimethylbenzoyl)-phenylphosphine oxide, having a molecular weight of 418.5. Another exemplary photoinitiator is Esacure KIP 150, available from Lamberti Technologies, which is an oligomeric alpha hydroxyketone, oligo[2-hydroxy-2-methyl-1-[4-(1-methylvinyl)phenyl]propanone]. The photoinitiator(s) may be present in an amount of from 0 to about 10 wt % of the ink composition, including from about 5 to about 8 wt %.

A filler can be used to adjust the viscosity of the ink composition. Exemplary fillers include CLAYTONE HY, an organo clay available from Southern Clay Products, and silica-type materials such as AEROSIL 200 from Degussa. The thickening agent(s) may be present in an amount of from about 0.2 to about 5 wt % of the ink composition.

An exemplary thermal stabilizer is Sartomer CN3216, which is an acrylate stabilizing additive having a specific gravity of 1.113 at 25° C. and a viscosity of 1,100 cP at 25° C. Another exemplary thermal stabilizer is IRGASTAB UV 10, available from Ciba Specialty Chemicals, which acts as a radical scavenger to prevent thermal curing of UV curable components. The thermal stabilizer(s) may be present in an amount of from about 0.1 to about 1 wt % of the ink composition.

The ink compositions of the present disclosure are made using acoustic mixing. Acoustic mixing is a non-contact mixing technology that utilizes a low frequency acoustic field to facilitate mixing. This differs from conventional mixing technology where mixing is localized at the tips of impeller blades, along baffles, and/or by introducing tumbling components into the mixing vessel, which induce bulk flow. Using acoustic mixing, mixing occurs on a microscale level throughout the mixing volume. No moving objects are needed within the reaction vessel.

The viscosity of the system to be mixed depends on the application. The viscosity of the system to be mixed may be in the range of from about 100 to about 100,000 centipoise (cP). In some embodiments, the viscosity of the lithographic ink composition to be mixed is in the range of about 5,000 to about 20,000 cP, including about 10,000 cP. The processing time is also independent of the batch scale.

Advantageously, the temperature increase during the mixing of highly viscous ink compositions is about 15° C. or less. This advantage is particularly important where one or more components of the ink composition is/are thermally sensitive. Acoustic mixing also reduces overall processing time since the components of the ink composition may be added in fewer steps (e.g., in one step), thereby reducing actual mixing time while ensuring a thorough blending of the components.

Acoustic mixing can be applied to efficiently mix many types of systems, such as liquid-liquid systems, liquid-solid systems, gas-liquid systems, and solid-solid systems.

Acoustic mixers operate at the mechanical resonance frequency of the system (i.e. the ink composition). Resonance is the tendency of a system to oscillate with greater amplitude at some frequencies than at others. Frequencies at which the response amplitude is a relative maximum are known as the system's resonant frequencies, or resonance frequencies. At these frequencies, even small periodic driving forces can produce large amplitude oscillations, because the system stores vibrational energy. At the resonance frequency, a lossless transfer of the mixers mechanical energy into the materials being mixed occurs by the propagation of an acoustic pressure wave into the mixing vessel. This result is achieved by matching the mechanical operation of the mixer with the properties and characteristics of the range of materials to be mixed. In this regard, acoustic mixing differs from ultrasonic mixing, which uses frequencies which are orders of magnitude higher.

Generally, the methods of the present disclosure include the acoustic mixing of a reaction mixture at a resonance frequency. Melt mixing also occurs, either before or after the acoustic mixing. The product of these mixing steps, a mixed ink batch, is then milled to obtain the ink composition, having the form of small particles.

Generally, the reaction mixture is located within a reaction vessel. The acoustic mixing is created using multiple springs and multiple masses. An acceleration force is applied to the reaction vessel to create a boundary condition that is transmitted through the reaction vessel as a low-frequency acoustic wave.

The acoustic mixing can be performed for a period of about 3 minutes to about 20 minutes. Acoustic mixing may be performed at a frequency of about 50 Hz to about 100 Hz, including about 60 Hz. The acoustic mixing can be described as being performed at an acceleration of about 30 g's to about 130 g's (g=gravities). The reaction mixture (i.e. the reaction vessel) may have a volume of about 4 gallons to about 60 gallons.

Acoustic mixing can be sufficient to convert a reaction mixture into a mixed ink batch, which is subsequently milled to obtain the ink composition. Here, the reaction mixture can contain a plurality of curable compounds (i.e. oligomer and monomer), colorant, dispersant, photoinitiator, thermal stabilizer, and filler. The acoustic mixing may be performed, for example, for a period of about 5 minutes at 100 g's.

When melt mixing is performed prior to the acoustic mixing, the melt mixing is done with a starting mixture that includes the plurality of curable compounds (i.e. oligomer and monomer), dispersant, photoinitiator, thermal stabilizer, and filler, but does not include the colorant. The colorant is added after melt mixing is complete, and prior to the acoustic mixing. Alternatively, melt mixing may be performed after the acoustic mixing and before the milling. The melt mixing can be performed for a period of about 10 minutes to about 1 hour. The melt mixing can be performed at a temperature of about 50° C. to about 100° C. The melt mixing is typically performed using, for example, an anchor impeller.

Heat can be applied during the milling. The temperature of the ink on the 3-mill rollers may be elevated above room temperature, such as to a temperature of about 40° C. to about 50° C. An Erweka 3-roll mill can be used, and the mixed ink batch can be passed through the mill multiple times.

The acoustic mixing enables a single mixing step of components, reduces processing steps, requires less processing time (e.g., at least 60% less processing time required), and has a reduced temperature increase during processing compared to shear mixing. The properties of the resulting inks prepared using acoustic mixing are almost identical to inks prepared by conventional high shear mixing processes.

In contrast, conventional methods of preparing lithographic ink compositions use high shear mixing, are very time consuming, and are very complex as they involve a multitude of steps. In addition, the processing time usually increases as the amount/volume of ink composition increases. Conventional methods include multiple steps such as (1) blending monomer, oligomer, and dispersant; (2) adding thermal stabilizer and filler, and subsequent blending; (3) adding photoinitiators, and subsequent blending; (4) mixing and pre-wetting of pigment; (5) high shear mixing using a disperser blade; (6) milling; and (7) discharge. The time needed for these steps will increase as the batch scale increases. It is estimated that processing times for the conventional methods are around 210-220 minutes, while the methods of the present disclosure using acoustic mixing require only 50-90 minutes.

Aspects of the present disclosure may be further understood by referring to the following examples. The examples are illustrative, and are not intended to be limiting embodiments thereof.

EXAMPLES

Table 1 lists the components included in the ink compositions of the Examples:

All components of the inks were weighed in a plastic 125 mL bottle. The samples were then processed in a Resodyn ResonantAcoustic® mixer for 5 minutes at 90% intensity and 60 Hz frequency. The processed samples were then discharged into a metal beaker and stirred with heating using an anchor impeller for about 30 minutes at 80° C. The inks were finally passed three times through a 3-roll mill and discharged in bottles Several inks were prepared using the formulations described in Table 1. The inks included white inks W15, W16, and W19; magenta inks M18 and M21; and cyan ink C99.

Comparative Example

Magenta ink M19 contained the same ingredients as M18, but was prepared using the traditional ink making process. The process included blending monomer, oligomers, and dispersant for 30 minutes using an anchor impeller and heating. The thermal stabilizer and filler were then added, and the mixture was mixed for 30 minutes using an anchor impeller and heating. Next, the photoinitiators were added and another mixing step was performed for 30 minutes. Mixing and pre-wetting of the pigment was performed for 75 minutes. High shear mixing using a disperser blade (Dispermat) was then performed for 30 minutes at 5,000 rpm and heating. Milling for 3 passes was performed using an Erweka 3-roll mill. The contents were collected.

Tack

Each of the inks was tested on an Inkometer 1100 (available from Thwing-Albert Company). The UV ink-rated rollers on the Inkometer were equilibrated at 32.2° C. In each case, 1.3 mL of ink was applied to the distribution roll where transfer and distribution onto the other rollers was allowed to continue for 15 seconds at 150 RPM, after which the speed of the rollers was automatically increased to 1200

TABLE 1

| Ink formulation | | | White | Magenta | Cyan |
|---|---|---|---|---|---|
| | Component | Available from | Wt % | Wt % | Wt % |
| Pigment | TiO2 Ti-Pure R931 | Dupont | 35 | 0 | 0 |
| | TiO2 Ti-Pure R706 | Dupont | | 0 | 0 |
| | PR57:1 Permanent Rubine L5B 01 | Clariant | 0 | 15 | 0 |
| | PR57:1 IRGALITE Magenta D 4201 | BASF | 0 | 15 | 0 |
| | HELIOGEN Blue 7088 | BASF | 0 | 0 | 15 |
| Dispersant | SOLSPERSE 39000 or J200 | Lubrizol | 0 | 6 | 4.5 |
| | XD A-504 | King Industries | 5.25 | 0 | 0 |
| Oligomers | CN294E | Sartomer Company | 31.73 | 48.91 | 65 |
| | CN2256 | Sartomer Company | 5.65 | 8.81 | 0 |
| Monomers | SR9035 | Sartomer Company | 12.36 | 0 | 5.49 |
| | SR501 | Sartomer Company | 0 | 11.27 | 0 |
| Photoinitiator | IRGACURE 379 | BASF | 2 | 2 | 2 |
| | IRGACURE 819 | BASF | 0.4 | 1.39 | 1.39 |
| | IRGACURE 184 | BASF | 1 | | |
| | Esacure KIP 150 | Lamberti Technologies | 3.62 | 3.62 | 3.62 |
| Thermal stabilizer | CN3216 | Sartomer Company | 1 | 1 | 1 |
| Filler | Claytone HY | Southern Clay Products | 2 | 2 | 2 |
| | Total | | 100 | 100 | 100 |

RPM. Tack measurements of the ink occurred every 20 seconds for 10 minutes. Table 2 includes the collected tack data:

TABLE 2

| Metric | W15 | W16 | W17 | M18 | M19 | M21 |
|---|---|---|---|---|---|---|
| Minimum tack (g-m) | 21.4 | 21.5 | 26.3 | 27.1 | 27.2 | 32.6 |
| Maximum tack (g-m) | 24.9 | 25.9 | 32.3 | 37.6 | 34.7 | 41.0 |
| Average tack (g-m) | 22.0 | 22.2 | 27.6 | 29.0 | 29.3 | 33.5 |
| 60 sec tack (g-m) | 22.7 | 22.9 | 27.6 | 29.6 | 31.8 | 33.7 |

The tack values for the inks made using acoustic mixing were found to be in the range of acceptable tack (between 20 and 50 g-m). Tack within this range enabled good transfer onto substrates in an ITR fixture simulated to function as a lithographic press which included an ink anilox delivery system and means to transfer the ink from a receiving plate to paper.

Magenta inks M18 and M19 exhibited almost identical tack properties, indicating that ink compositions produced according to the methods of the present disclosure are suitable.

Rheology

The inks were tested on a RFS-3 rheometer (available from Rheometrics Scientific, now part of TA Instruments) at 35° C. using a frequency sweep protocol such that the frequency ranged from 0.1 to 100 rad/s.

Selected viscosity metrics included the viscosities at a very low frequency (0.1 rad/s), intermediate frequencies (1 and 10 rad/s), and the highest frequency the instrument was capable of measuring (100 rad/s). The rheology data is provided below in Table 3. Data for Magenta ink commercially available from a vendor is also included.

TABLE 3

| Complex Viscosity (mPa · s) | Vendor Magenta | W15 | W16 | W17 | M18 | M19 | M21 |
|---|---|---|---|---|---|---|---|
| 0.1 rad/s | 4.10E+06 | 4.00E+06 | 2.76E+06 | 1.71E+06 | 9.58E+06 | 5.08E+06 | 3.13E+06 |
| 1 rad/s | 1.12E+06 | 6.52E+05 | 4.49E+05 | 3.47E+05 | 2.05E+06 | 1.14E+06 | 7.01E+05 |
| 10 rad/s | 3.06E+05 | 1.35E+05 | 1.15E+05 | 1.05E+05 | 5.78E+05 | 3.92E+05 | 2.41E+05 |
| 100 rad/s | 8.50E+04 | 4.20E+04 | 4.07E+04 | 3.82E+04 | 1.81E+05 | 1.46E+05 | 9.40E+04 |

Magenta inks M18 and M19, which respectively were prepared via an acoustic mixing process of the present disclosure and a conventional mixing process, had similar rheologies. The example inks displayed dynamic rheologies similar to a commercial UV lithographic ink. It has been determined from experimental test prints that the rheologies of these inks were in the range for successful ink delivery and transfer considerations.

Time sweep data was generated to probe the stability of the ink. The stability of the inks was determined using a RFS-3 rheometer (available from Rheometrics Scientific, now part of TA Instruments) at 35° C. using a time sweep protocol such that the frequency and strain were at 50 rad/s and 0.1%, respectively.

Figure 2A:
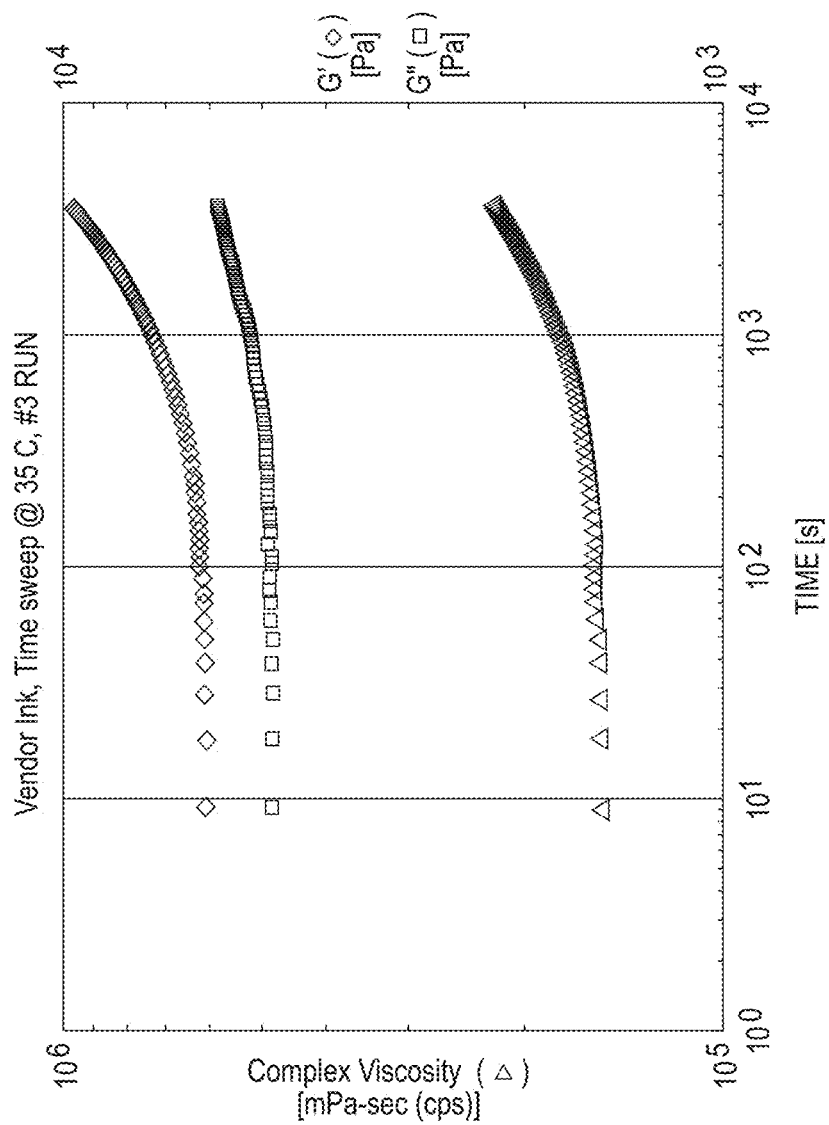
FIG. 2A illustrates time sweep data for magenta ink from a vendor. Triangles are complex viscosity, diamonds are G', and squares are G".
Figure 2B:
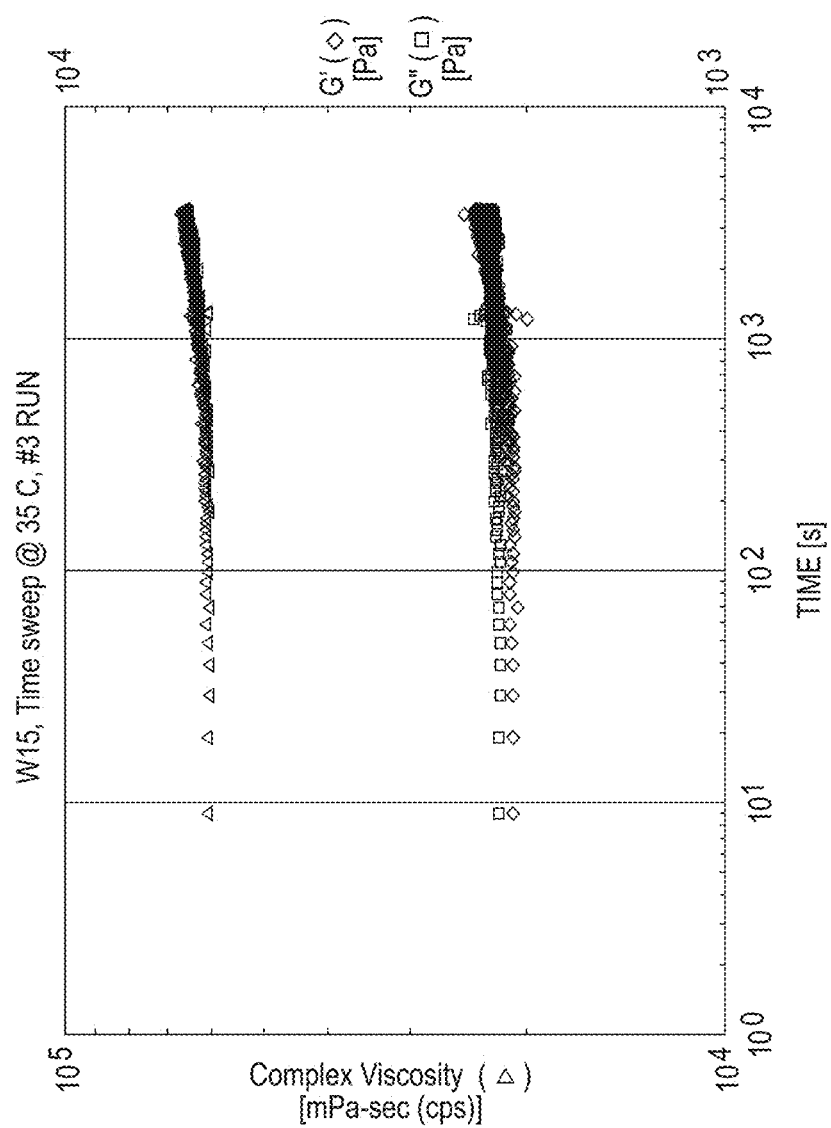
FIG. 2B illustrates time sweep data for a first white ink of the present disclosure. Triangles are complex viscosity, diamonds are G', and squares are G".
Figure 2C:
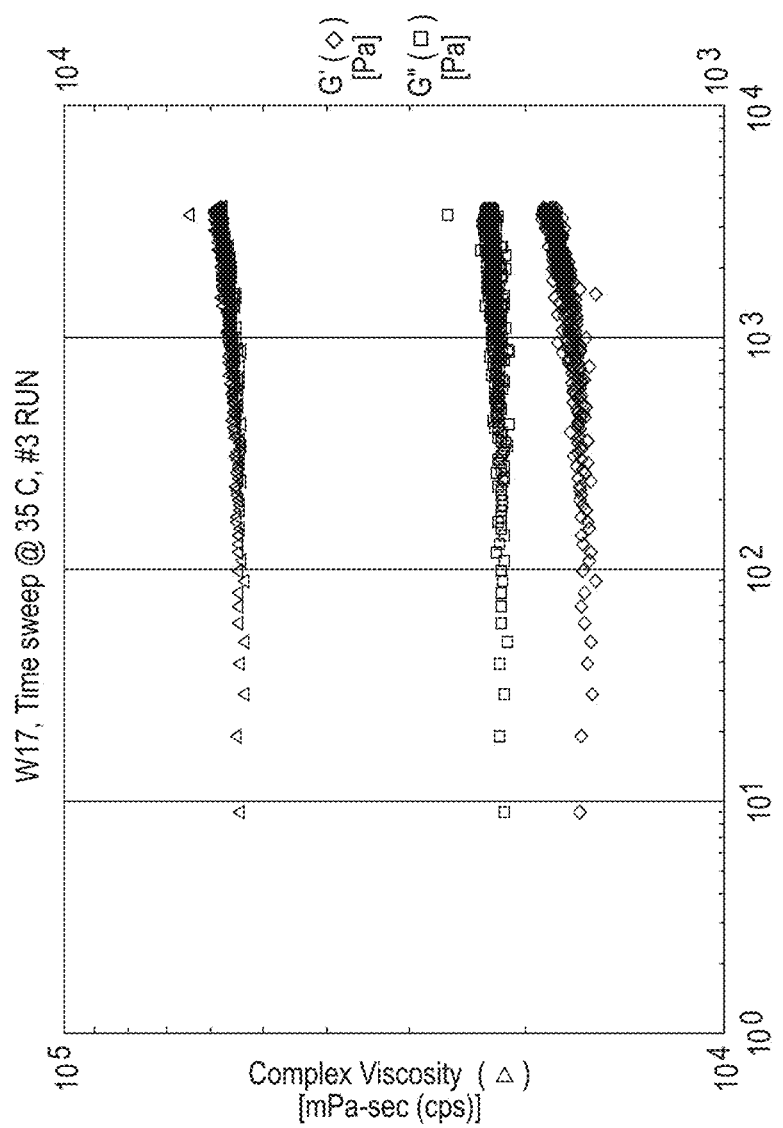
FIG. 2C illustrates time sweep data for a second white ink of the present disclosure. Triangles are complex viscosity, diamonds are G', and squares are G".

In the example inks, good stability of complex viscosity, G' and G" (elastic and viscous moduli, respectively) were observed. The data contrasts the performance of the Toyo magenta ink (industry standard). The data for the magenta ink obtained from a vendor is plotted in FIG. 2A. Without wishing to be bound by theory, it is believed that the evaporation of a volatile solvent contributed to the increasing g' and G" moduli as the rheology test was occurring. Time sweep data for white inks W15 and W17 is displayed in FIG. 2B and FIG. 2C.

The time sweep data illustrates the relative stability of the inks. It is desirable that the inks' viscosities and the G' and G" moduli do not vary by more than about 20% over the course of the time sweep test, which indicates the degree of stability of the pigment particles as they are dispersed in the ink vehicle. The rheology data indicates that the white inks (W15 and W17) were similar to each other and suitable for lithographic applications.

Print Testing

Various print targets were used to generate prints from the example inks using an A.B. Dick 360 CD Offset press. The examples inks were delivered onto black and transparent substrates via a flexo plate with the subsequent prints then cured using a Fusion UV "H" lamp at 1.5 m/s.

Figure 3:
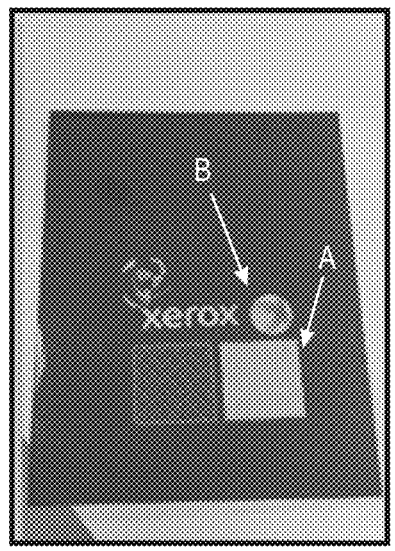
FIG. 3 illustrates W16 printed and cured on an 8.5×11" Mylar substrate. Solid Area is Large Square A and Halftones are taken from the Xerox Logo B.
Figure 4:
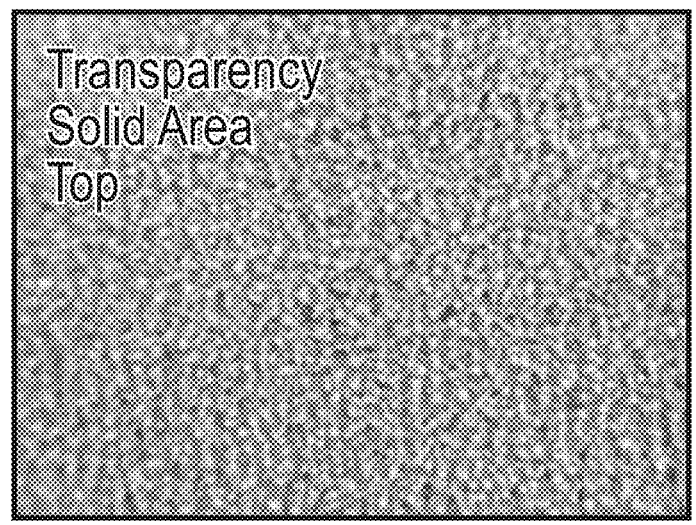
FIG. 4 is a micrograph (5 mm×6 mm scale) of W16 Solid Area on Mylar film.
Figure 5:
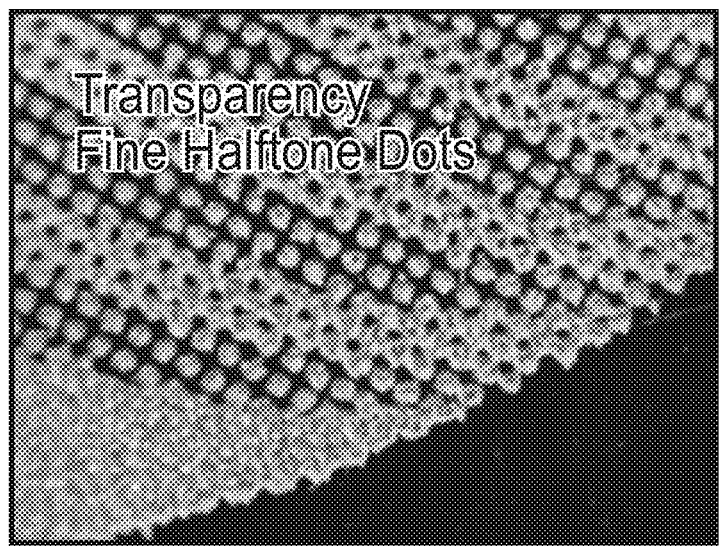
FIG. 5 is a micrograph (5 mm×6 mm scale) of W16 Halftone on Mylar film.

FIG. 3 illustrates W16 printed and cured on an 8.5×11" Mylar substrate. Solid Area is Large Square A and Halftones are taken from the Xerox Logo B. FIG. 4 is a micrograph (5 mm×6 mm scale) of W16 Solid Area on Mylar film (large square A in FIG. 3). FIG. 5 is a micrograph (5 mm×6 mm scale) of W16 Halftone on Mylar film (Xerox logo B in FIG. 3).

The present disclosure is described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A method for producing an ink composition, comprising:
   acoustically mixing a reaction mixture to form a mixed ink batch; and
   milling the mixed ink batch to obtain the ink composition, wherein heat is applied during the milling of said mixed ink batch; and
   wherein the mixed ink batch is heated to a temperature of about 40° C. to about 50° C. during the milling.

2. The method of claim 1, further comprising melt mixing the mixed ink batch prior to milling the mixed ink batch.

3. The method of claim 2, wherein the melt mixing is performed for a period of about 10 minutes to about 1 hour.

4. The method of claim 2, wherein the melt mixing is performed at a temperature of about 50° C. to about 100° C.

5. The method of claim 1, further comprising:
   melt mixing a starting mixture that does not contain colorant; and
   adding a colorant to the starting mixture to form the reaction mixture that is subsequently acoustically mixed.

6. The method of claim 5, wherein the melt mixing is performed for a period of about 10 minutes to about 1 hour.

7. The method of claim 6, wherein the melt mixing is performed at a temperature of about 50° C. to about 100° C.

8. The method of claim 5, wherein the starting mixture comprises a dispersant, a plurality of curable compounds, a photoinitiator, a thermal stabilizer, and a filler.

9. The method of claim 1, wherein the acoustic mixing is performed for a period of about 3 minutes to about 20 minutes.

10. The method of claim 9, wherein the acoustic mixing is performed at an acceleration of about 30 g's to about 130 g's.

11. The method of claim 9, wherein the acoustic mixing is performed at a frequency of from about 50 Hz to about 100 Hz.

12. The method of claim 1, wherein the reaction mixture has a volume of about 4 gallons to about 60 gallons.

13. The method of claim 1, wherein the reaction mixture comprises, based on the total weight of the reaction mixture, more than 50 wt % of a plurality of curable compounds.

14. The method of claim 13, wherein the plurality of curable compounds includes:

from about 3 to about 75 wt % of at least one oligomer; and from about 3 to about 25 wt % of at least one monomer.

15. The method of claim 13, wherein one or more of the curable compounds in the plurality of curable compounds are crosslinkable.

16. The method of claim 13, wherein the reaction mixture further comprises:

from about 10 to about 40 wt % of a colorant;

from about 4 to about 16 wt % of a dispersant;

from 0 to about 10 wt % of a photoinitiator;

from about 0.1 to about 1 wt % of a thermal stabilizer; and from about 0.2 to about 5 wt % of a filler.

17. The method of claim 14, wherein the at least one oligomer is a polyester acrylate.

18. The method of claim 14, wherein the at least one monomer is a trimethylolpropane triacrylate.

19. The method of claim 1, wherein the mixed ink batch is heated to a temperature of about 40° C. to 50° C. during the milling.

* * * * *